2 Sheets--Sheet 1.

J. P. MANNY.

Mowing-Machine.

No. 6,381. Reissued April 13, 1875

Witnesses:
Edw. W. Donn
M. Gardner.

Inventor:
John P. Manny

J. P. MANNY.

Mowing-Machine.

No. 6,381. Reissued April 13, 1875.

Witnesses:
Edw. W. Bond
M. Gardner.

Inventor:
John P. Manny

UNITED STATES PATENT OFFICE.

JOHN P. MANNY, OF ROCKFORD, ILLINOIS.

IMPROVEMENT IN MOWING-MACHINES.

Specification forming part of Letters Patent No. 18,510, dated October 27, 1857; extended seven years; reissue No. 6,381, dated April 13, 1875; application filed April 7, 1875.

*To all whom it may concern:*

Be it known that I, JOHN P. MANNY, of Rockford, in the county of Winnebago and State of Illinois, have invented certain new and useful Improvements in Harvesters, of which the following is a specification:

The improvements constituting this invention relate, in part, to that class of harvesting-machines in which the cutter-bar or finger-beam is attached to an adjustable frame which is capable of being raised and lowered in relation to an upper carrying-frame; and, in this branch of it, it consists, first, in mounting the devices by which the finger-beam of the machine is raised and lowered upon, or supporting them by, the finger-beam itself, so that the driver, from his seat, can thereby raise and lower the cutters at will without stopping the machine; and, secondly, in so connecting the finger-beam and the lifting devices to such adjustable frame as to enable the cutters to be presented to the grain or grass at an operative angle at the different elevations of the cutting apparatus. In rear-cut machines particularly, in which two frames are employed—an upper carrying-frame and a lower frame, to which the finger-beam or cutter-bar is attached, such lower frame being joined to the upper one by a hinge-connection, so as to be adjusted at various heights—it is important that the finger-beam be attached to such lower frame by loose or hinge joints. This will permit the angle between the frame and the finger-beam to change as the latter rises and falls, and thus always maintain the cutters at an operative angle with the grain or grass. The invention further consists, as hereinafter more fully described, in an improved mode of raising and supporting the outer or grain end of the finger-beam and connected parts.

The accompanying drawings show the invention as applied to a one-wheel machine.

Figure 1:
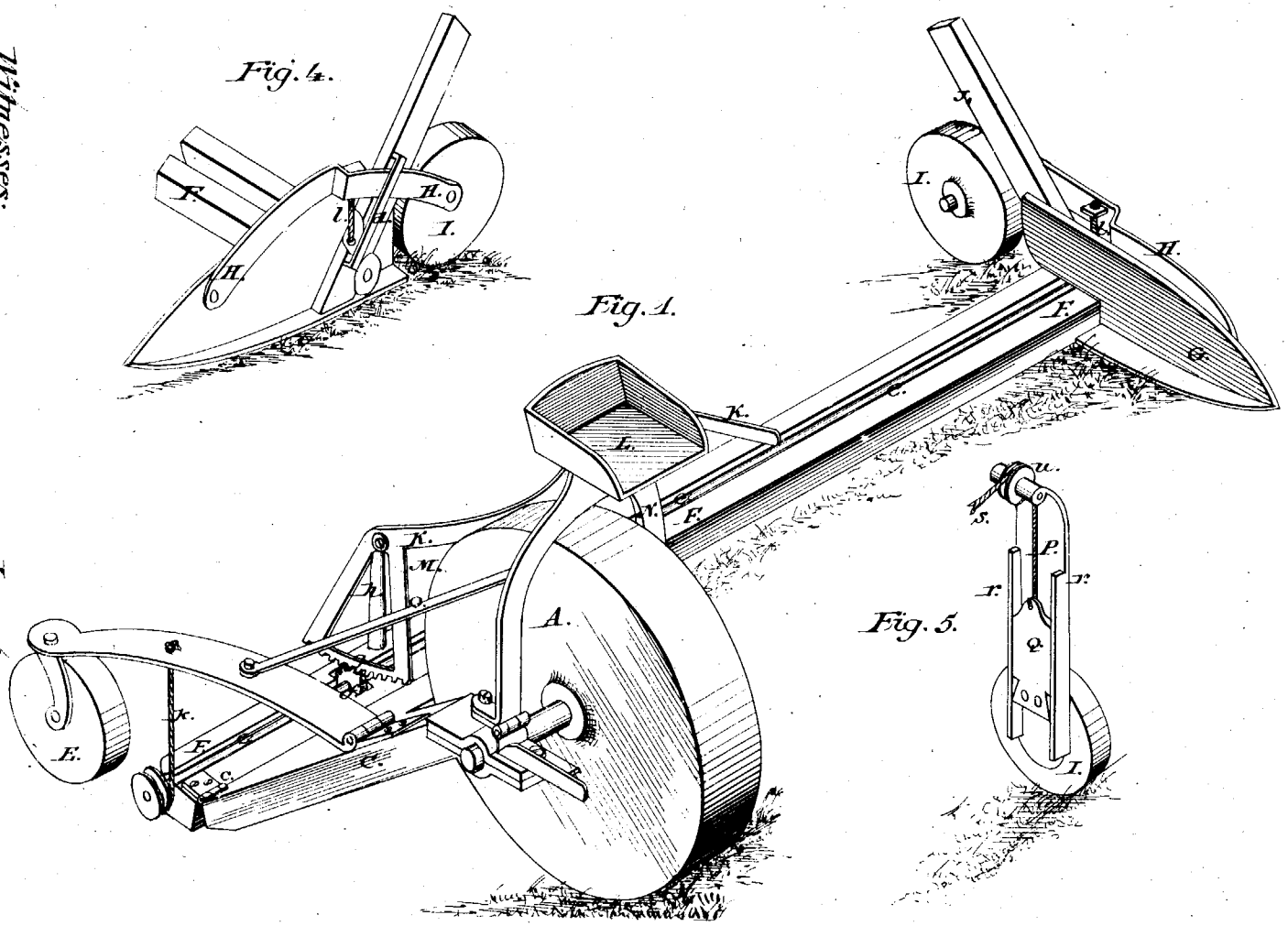
Figure 2:
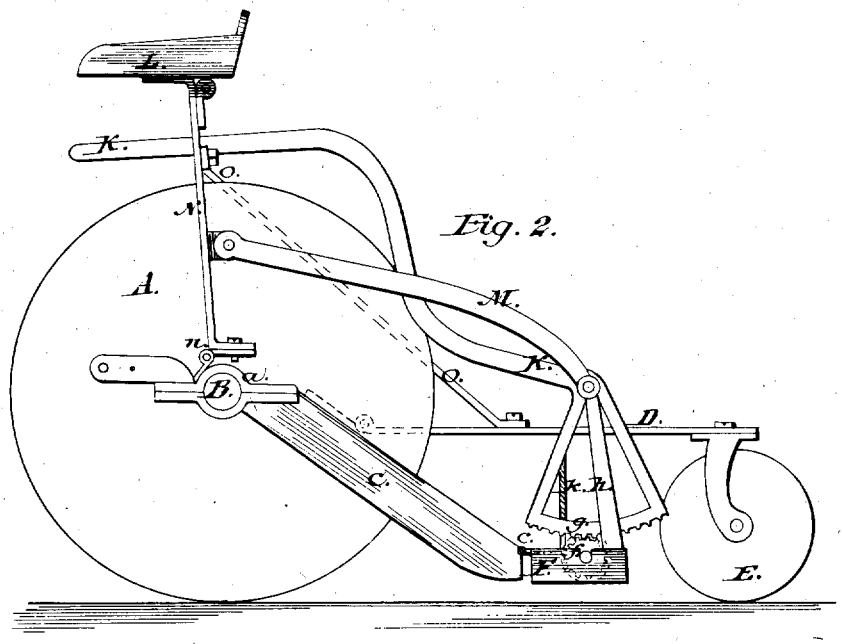
Figure 3:
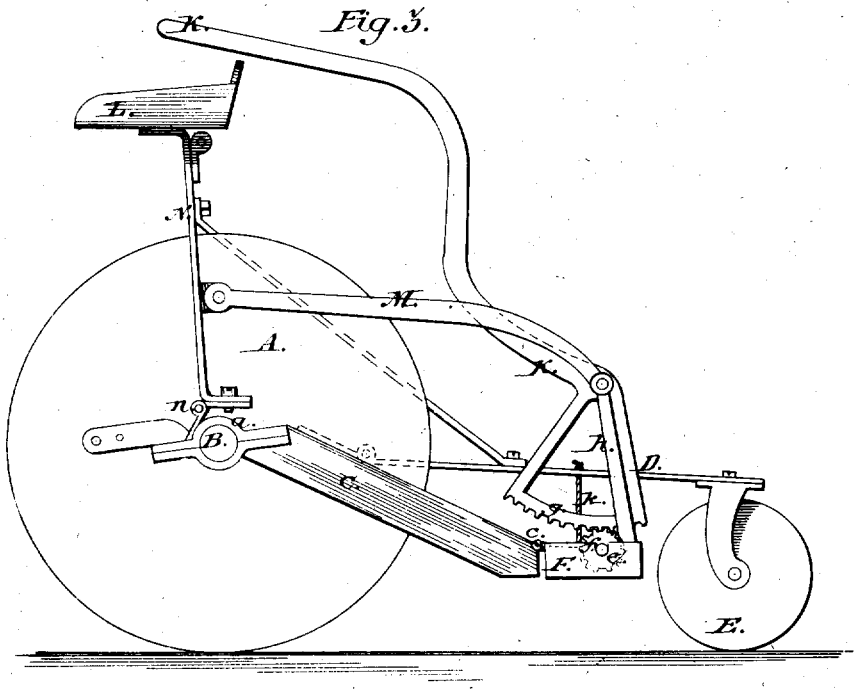

Figure 1 is a perspective view of so much of the machine as will illustrate its peculiarities of construction. Fig. 2 is a side elevation of the inner end of the machine, with the cutter-bar upon the ground. Fig. 3 is a similar view, with the cutter-bar raised as in reaping. Fig. 4 is a perspective view of the outer or grain end of the cutter-bar, with the divider and supporting-wheel. Fig. 5 represents a different mode of attaching the supporting-wheel to the grain end of the cutter-bar.

To enable others skilled in the art to make and use my invention, I will proceed to describe its construction and operation in the form shown in the drawings.

A represents the main supporting and driving wheel, the journals of whose axle B are supported by, and turn in, boxes *a*, attached to the frame C, so that said frame may hinge with, or be raised or lowered on, said journals. To this frame C is hinged, at the point *b*, or at any other point nearer to the axle B, or to the axle itself, a carrying-frame, D. The rear end of the upper frame D is supported by a caster-wheel, E. The object in using a caster-wheel is to facilitate the turning of the machine; otherwise a single supporting-wheel might be used. To the rear of the frame C is hinged, by the hinges *c c*, the cutter-bar F, which may be of the usual length. The outer end of said bar has attached to it a divider, G, for dividing the grass or grain that is to be cut from that which is to be left standing. An arm, H, is pivoted to the divider at a point in front of the line of the cutter-bar; and to the rear end of this arm H is hung the outer supporting-wheel I. Said arm H passes through a guide, *d*, fixed in the brace or post J. A longitudinal groove is provided in the cutter-bar F, in which is laid or placed a rod or shaft, *e*, with proper supports, in which it may freely turn; and on this shaft *e* there is a pinion, *f*, into which a segmental rack, *g*, takes, said rack *g* being connected to a lever, K, pivoted to the top of the post or standard *h*, and extending to the seat L, so that the driver or conductor, from his seat, may, with his hand or foot, operate said lever, and, through the segmental rack *g* and pinion *f*, turn the shaft *e* in its supports or bearings. At each of the extreme ends of the cutter-bar are arranged pulleys *i i'*, to the former (*i*) of which is connected one end of a cord or chain, *k*, the other end being attached to the upper frame D, and to the latter (*i'*) is also connected one end of a cord, *l*, the other end of which is attached to the arm H, so that when the shaft *e* is rotated in one direction, it will, by winding up the cords or chains on its pulleys, raise up the cutter-bar, and, by reversing its motion, let the cutter-bar down again.

I can, if desired, dispense with the long shaft or rod running through the cutter-bar, and substitute therefor a cord or chain, as will be explained in connection with Fig. 5.

The standards N, that support the seat L, are hinged, as at *n*, to compensate for the rolling of the boxes as the frame C is raised and lowered. These standards, moreover, are braced from the frame D by the piece O, and thus the seat L is sustained in nearly the same position, whatever be the vertical elevation of the frame C. Its position would remain exactly the same were the joint at *b* moved up to or made on the axle, or immediately under the seat. To the top of the standard or post *h* is pivoted one end of a radius-bar, M, the other end thereof being similarly connected to the standard N.

This bar M, of course, keeps the top of the post *h* and the standards N at a uniform distance from each other, and this, with the hinged joint in front of the cutter-bar at *c*, keeps the cutter-bar (and the platform when connected to it) horizontal with the ground, and admits of its rising and falling in planes that are, for all practical purposes, parallel with each other.

It will be seen that the cutter-bar, except when resting directly upon the ground, is held up at both ends by frames that rest upon wheel-supports, and that both ends can be raised or lowered, relatively to the supporting-wheels, simultaneously and while the machine is in motion. From this it results, among other things, that the parts may be made much lighter, as they are not subjected to such strain as would otherwise be the case.

The flexible connection that exists in this machine between the upper and the lower frame, together with the capacity of adjusting the lower frame at any desired elevation, without at the same time tilting the cutters up or down so far as to interfere with its practical efficiency, renders this a machine that may readily be converted from a mower into a reaper, and vice versa.

A special peculiarity of this invention will be found in the fact that the lifting-lever, instead of being located upon the carrying-frame, as in the ordinary two-frame machines, is mounted upon the lower or adjustable frame, or rather upon the cutter-bar connected with such frame.

Fig. 5 represents a modification of the plans heretofore described for raising and lowering the cutter-bar. It is as follows: I is the outer supporting-wheel, hung to an upright piece, P. Two flanges, *r r*, are formed or turned on this piece P, to form ways or guides for a plate, Q, to travel in, said plate being permanently attached to the end of the cutter-bar. A cord or chain, *s*, has one of its ends attached to the plate Q, and then passes over a pulley, *u*, in the top of upright piece P, and thence down underneath or through a groove or opening in the cutter-bar to the opposite end thereof, where it may be wound up on the same pulley with the cord or chain at that end, or taken up by the raising-lever in any of the well-known ways.

The effect in this case is precisely the same as in the former one, viz: The cutter-bar is sustained at both of its ends by wheel-supports, it is raised and lowered by both its ends, and, while it is being raised or lowered, it does not practically change its horizontality with regard to the ground.

It will be seen that in both of the constructions shown in Figs. 4 and 5, the grain-wheel is attached to and supported by a vertically-adjustable piece, which is intermediate between the wheel and the rod, cord, or chain that passes to the other end of the cutting apparatus, by means of which the driver regulates the relative vertical position of the grain-wheel and the cutter-bar.

In order that the driver may thus have control over the grain-wheel, it is necessary that this intermediate piece or support be given a free vertical movement upon its pivot or ways. This enables the driver, by the use of the lifting-lever and the connecting rod, cord, or chain, to set the wheel at any desired elevation.

When the rod is used, the grain end thereof is connected with the adjustable grain-wheel support by a flexible connection, and in this respect the invention is believed to differ materially from a rod provided with a pinion gearing into a rack upon such support.

A rigid connection at each end of the cutter-bar requires the constant attention of the driver, because of the liability of the bar to strike or come against obstructions on the ground, and, if not allowed to rise itself, to mount over such obstruction, it is liable to break or be injured. By the use of the flexible connections the cutter-bar is free to rise and surmount any intervening obstacle, and then drop again to its adjusted height above the ground without the aid of the driver or conductor.

What I claim as new is—

1. The combination, in a harvester, of a carrying-frame, a cutter-bar flexibly connected therewith through the medium of a supplementary frame arranged below such carrying-frame, and vertically adjustable relatively thereto, and a lever mounted upon or supported by such cutter-bar, the combination being constructed to operate substantially as described, so that the driver from his seat may raise and lower the cutters at will while the machine is in motion.

2. The combination, in a harvester, of a carrying-frame, a supplementary frame vertically adjustable relatively thereto, and supported therefrom by flexible connections, a cutter-bar hinged to such supplementary frame, and a lever mounted upon or supported by the cutter-bar, the combination being constructed to operate substantially as described, so that the driver from his seat can raise and lower the cutters at will while the machine is in motion, and so that the cutters will rise and fall automatically in passing obstructions.

3. The combination, in a harvester, of a grain-wheel, an adjustable support for such wheel, having free vertical movement relatively to the cutter-bar, and lifting devices located near the driver's seat, and connected, by flexible connections at the divider end of the cutter-bar, with the grain-wheel support, substantially as described, so that the driver may thereby raise and lower the outer end of the cutter-bar while the machine is in motion.

4. The combination, substantially as described, of a grain-wheel, a lever for supporting such wheel, pivoted forward of the line of the cutter-bar, and a rod, cord, or chain passing in rear of the cutters, and connected with a lever near the driver's seat, so that the driver can regulate the outer end of the cutters while the machine is in motion.

JOHN P. MANNY.

Witnesses:
THOMAS C. CONNOLLY,
A. E. BEECHER.